United States Patent [19]

Netravali et al.

[11] 4,278,996
[45] Jul. 14, 1981

[54] TECHNIQUE FOR ENCODING PICTORIAL INFORMATION

[75] Inventors: Arun N. Netravali, Matawan; John D. Robbins, Aberdeen, both of N.J.; John A. Stuller, Rolla, Mo.

[73] Assignee: Bell Telephone Laboratories, Incorporated, Murray Hill, N.J.

[21] Appl. No.: 139,584

[22] Filed: Apr. 11, 1980

[51] Int. Cl.³ ............................................ H04N 7/12
[52] U.S. Cl. .................................................. 358/136
[58] Field of Search ............. 358/136, 138, 105, 133, 358/135; 364/514, 515; 340/347 AD; 375/28

[56] References Cited

U.S. PATENT DOCUMENTS

| | | | |
|---|---|---|---|
| 3,632,865 | 1/1972 | Haskell et al. | 358/136 |
| 4,051,530 | 9/1977 | Kuroda et al. | 358/136 |
| 4,218,703 | 8/1980 | Netravali et al. | 358/136 |
| 4,232,338 | 11/1980 | Netravali et al. | 358/136 |
| 4,245,248 | 1/1981 | Netravali et al. | 358/136 |

OTHER PUBLICATIONS

F. W. Mounts, "A Video Encoding System Using Conditional Picture-Element Replenishment", B.S.T.J., vol. 48, No. 7, 9-69, pp. 2545-2554.

*Primary Examiner*—John C. Martin
*Assistant Examiner*—Edward L. Coles
*Attorney, Agent, or Firm*—Barry H. Freedman

[57] ABSTRACT

Pictorial information is encoded using an interframe prediction technique which accounts for spatial and/or temporal changes in illumination. In one embodiment (FIG. 3), the intensity value of each element of a picture is predicted using the intensity of the corresponding element in a previous frame and a recursively updated gain factor $p$ which can account for both illumination changes as well as object movement. The prediction error and pel location is encoded only if the error exceeds a predetermined threshold. In a second embodiment (FIG. 3), additional predictions are made using displacement compensated prediction alone and in combination with gain adjustment. The best predictor is selected and the corresponding prediction error transmitted only if it is large.

24 Claims, 11 Drawing Figures

GAIN COMPENSATED DECODER

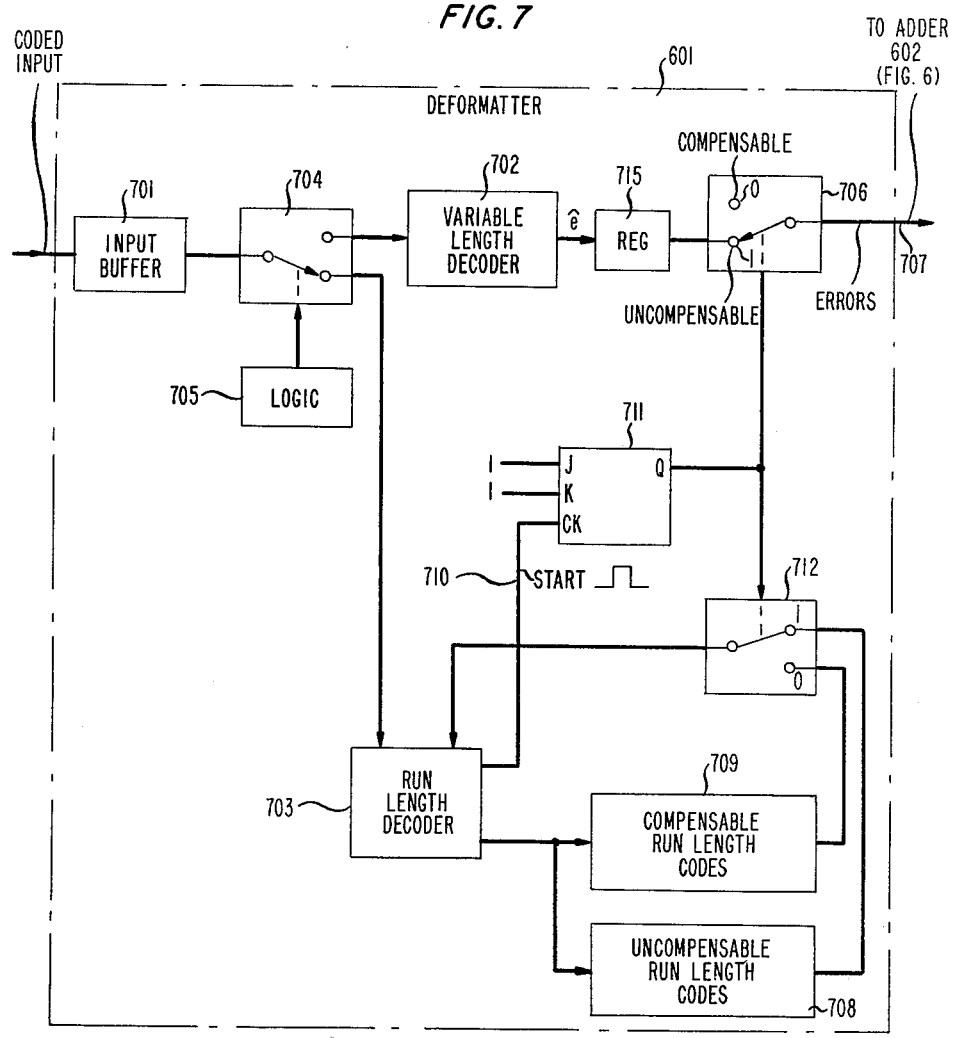
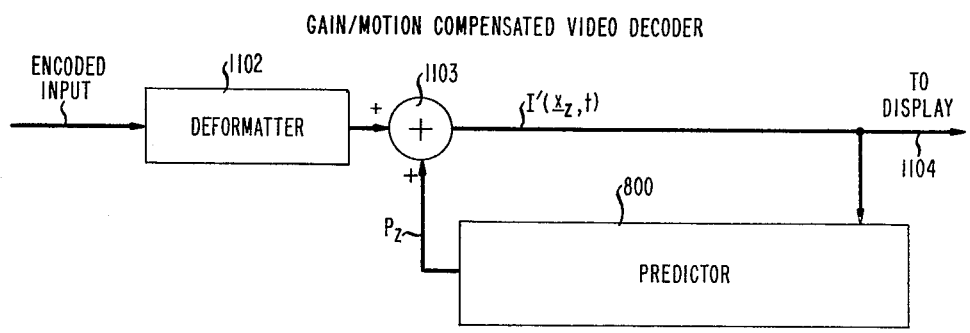

| FIG. 8 |
| FIG. 9 |

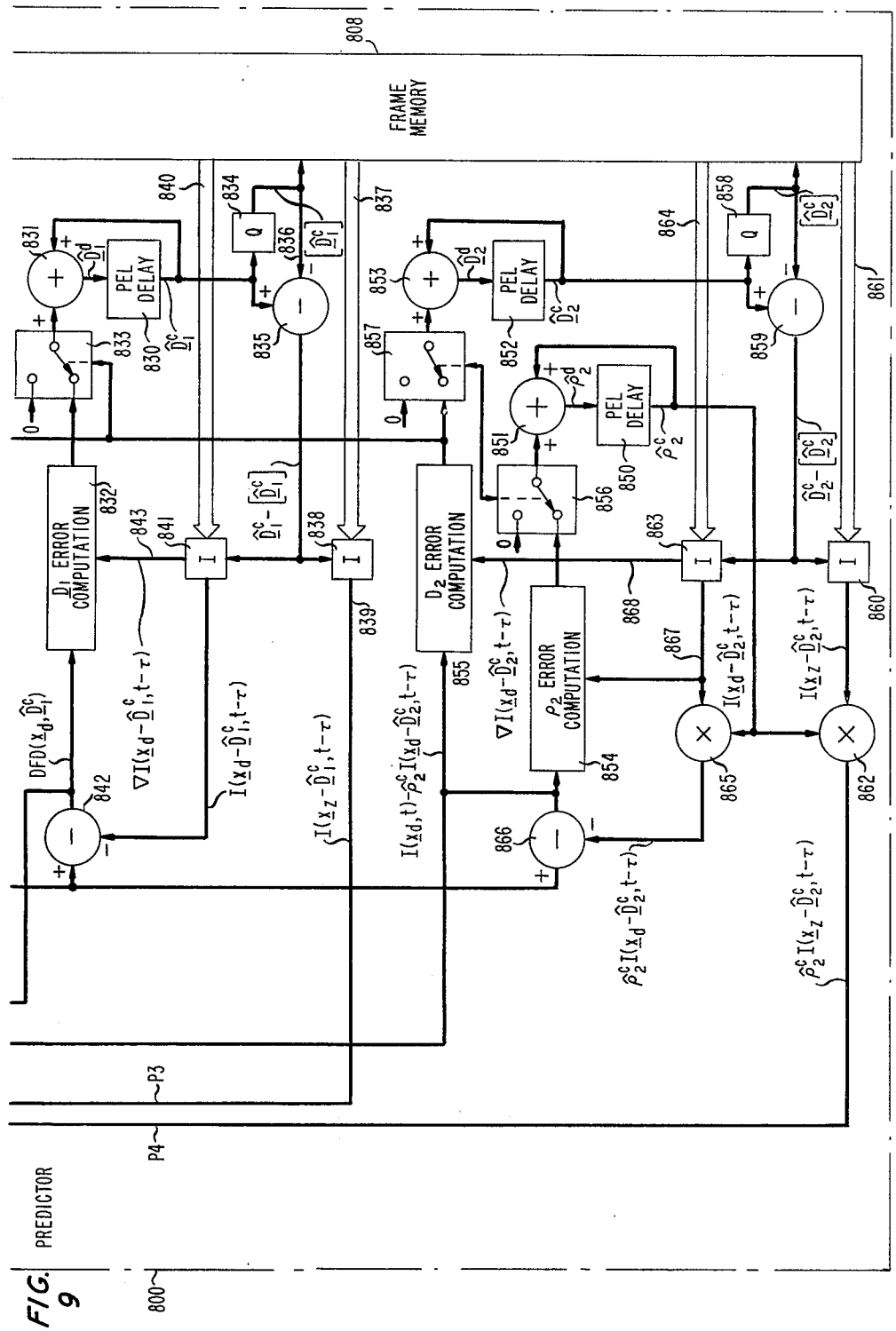

TECHNIQUE FOR ENCODING PICTORIAL INFORMATION

TECHNICAL FIELD

The present invention relates generally to a technique for encoding pictorial information and, more specifically, to an interframe video signal encoding scheme in which spatial and/or temporal changes in illumination can be accounted for in addition to movement of objects in the picture.

BACKGROUND OF THE INVENTION

More than a decade ago, it was realized that a significant amount of redundancy could be eliminated from a television signal by encoding information concerning only those portions of each frame that differed significantly from a preceding frame. See F. W. Mounts, "A Video Encoding System Using Conditional Picture-Element Replenishment", *Bell System Technical Journal*, Vol. 48, No. 7, September 1969, pp. 2545-2554. The intensity value for the spatially corresponding picture element in the previous frame was used to predict the intensity value of the pel presently being processed. For pels in the moving area, the magnitude of the prediction error was encoded, together with the location of the changed pel.

Motion compensation techniques such as those described in U.S. Pat. No. 3,632,865 issued to B. G. Haskell and J. O. Limb on Jan. 4, 1972, improved on the earlier conditional replenishment work by attempting to determine the amount and direction of displacement that occurred in objects in the picture in the time interval between frames. By so doing, a location in the previous frame which offered an even better prediction of the present intensity value could be selected, reducing the magnitude of the error values to be encoded and enabling still more efficient processing. Recently, displacement estimation techniques have been improved by using a recursive technique to update each estimate based on previous estimates. This technique, described in the application of A. N. Netravali and J. D. Robbins, Ser. No. 21,063, filed Mar. 16, 1979, has been applied to predictive encoding in the pel domain (see application of A. N. Netravali and J. D. Robbins, Ser. No. 21,077, filed Mar. 16, 1979) as well as the transform domain (see application of A. N. Netravali and J. A. Stuller, Ser. No. 27,053, filed Apr. 4, 1979). Multiple predictors utilizing displacement compensation is also described in application of A. N. Netravali and J. D. Robbins, Ser. No. 46,953, filed June 8, 1979.

Notwithstanding the improvements in encoding efficiency enabled by recursive displacement estimation, that technique nevertheless does not take account of spatial and/or temporal changes in illumination that may occur in the pictures being encoded, since the prior art techniques all assume uniform lighting conditions. Furthermore, the above-mentioned displacement compensation techniques each require a fair amount of processing circuitry and can be relatively expensive, since a random access memory is generally required to enable retrieval of intensity values which represent displaced picture elements, and since spatial interpolations must be performed to determine intensity values and intensity gradients at picture locations which lie between the discrete points which correspond to the instants at which the video signal is sampled.

In view of the foregoing, it is the broad object of the present invention to improve the interframe coding of video signals with respect to spatial and/or temporal changes in illumination in the picture being processed. Specific objects include reduction in the prediction error in an interframe coder by anticipating illumination changes alone or in combination with movement of objects in the picture. Also, the ability to process the video signal without the need for random access memories and spatial interpolators is desired.

SUMMARY OF THE INVENTION

In accordance with the present invention, spatial and/or temporal changes in illumination of a picture are accounted for by defining a model of picture intensity which includes a variable gain term which is recursively updated. Each estimate can be updated, in one embodiment, using information derived from the previous frame without any spatial interpolation and using only a fixed delay. In another arrangement, a translation estimate is also generated recursively and is used in the gain updating process. The recursion can be performed from pel to pel, or for a group of pels or frames.

The prediction determined using the gain adaptation technique of the present invention can be used alone to enable better video signal predictive encoding, or it can be used in conjunction with one or more different predictors, each of which can be evaluated to determine the smallest prediction error for each picture element or group of elements. In the latter event, only the magnitude of the prediction error and the location of the "unpredictable" pel is transmitted to the receiver if the error is large. If small, no prediction error need be transmitted, since the same logic is available at the receiver to reproduce the predictor selected at the transmitter.

BRIEF DESCRIPTION OF THE DRAWING

The principles of operation of the present invention will be more fully appreciated by consideration of the following detailed description when read in light of the accompanying drawing in which:

FIG. 7 is a block diagram of deformatter 601 of FIG. 6;

FIGS. 8 and 9 are gain and motion compensated video encoders constructed in accordance with the present invention;

FIG. 10 illustrates the relationship of FIGS. 8 and 9; and

FIG. 11 is a decoder for recovering the video signal encoded with the apparatus of FIGS. 8 and 9.

DETAILED DESCRIPTION

Figure 1:
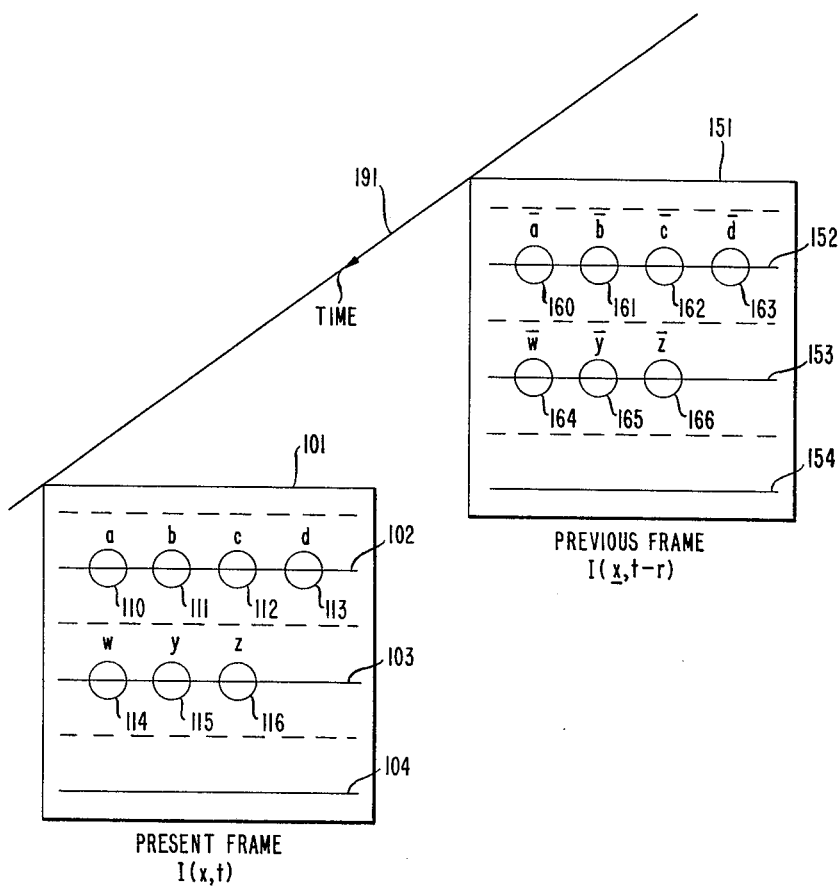
FIG. 1 is a diagram illustrating the configuration of picture elements in present and previously processed picture frames.

An understanding of the recursive displacement estimation technique described in the above-mentioned Netravali et al patent application Ser. No. 21,063 will be instructive in understanding the operation of the present invention, and that work is accordingly summarized briefly here. In that technique, the image intensity in the present frame (at time t) at a spatial location $\underline{x}$ (where the bar below the symbol indicates that $\underline{x}$ is a vector) was assumed equal to the intensity at a displaced location $\underline{x}-\underline{D}$ in the previous frame, at time $t-\tau$, where $\tau$ is the time interval between frames and $\underline{D}$ is the displacement vector occurring during the time interval from $(t-\tau)$ to t. Thus, $$I(\underline{x},t) = I(\underline{x}-\underline{D}, t-\tau). \quad (1)$$

The displacement vector $\underline{D}$ is determined recursively, using a steepest decent algorithm, such that the current ($i^{th}$) estimate $\hat{\underline{D}}^i$ of displacement vector is related to the previous ($i-1^{th}$) estimate $\hat{\underline{D}}^{i-1}$ by:

$$\hat{\underline{D}}^i = \hat{\underline{D}}^{i-1} - \epsilon \cdot DFD(\underline{x}, \hat{\underline{D}}^{i-1}) \cdot \nabla I(\underline{x} - \hat{\underline{D}}^{i-1}, t-\tau). \quad (2)$$

In equation (2), $DFD(\underline{x}, \hat{\underline{D}}^{i-1})$ is a "displaced frame difference" which is defined as the intensity difference between the present location $\underline{x}$ in the present frame, and the location $\underline{x}-\hat{\underline{D}}$ in the previous frame which is displaced by the amount of the last displacement estimate. Symbolically, $$DFD(\underline{x},\hat{D}) = I(x,t) - I(\underline{x}-\hat{\underline{D}}, t-\tau). \quad (3)$$

The carot " ^ " indicates that the displacement value is an estimate; when $\hat{D} = D$ (the true value), equation (1) indicates that $DFD=0$, as is desired. In equation (2), $\nabla I(\underline{x}-\hat{\underline{D}}^{i-1}, t-\tau)$ is the spatial gradient (rate of change) of intensity at the displaced location $\underline{x}-\hat{\underline{D}}^{i-1}$ in the previous frame, and $\epsilon$ is a positive scaling constant usually in the range $10^{-5} \leq \epsilon \leq 10^{-2}$, all as explained in the aforementioned application Ser. No. 21,063.

In several situations, the above model of image intensity is not adequate. The three examples of this which follow all involve certain conditions of illuminance $L(x,t)$ and reflectance $R(x,t)$ which together comprise the picture being processed. First, illuminance may be modulated with respect to time, reflectance being constant with respect to time. This situation corresponds to shadows created in the background of a scene as a result of a moving object, and is modelled by:

$$I(x,t) = L(t) \cdot R(x) \quad (4)$$

and $$I(x, t-\tau) = L(t-\tau) R(x) \quad (5)$$

and therefore, $$I(\underline{x},t) = \frac{L(t)}{L(t-\tau)} I(x, t-\tau). \quad (6)$$

Second, translational displacement of reflectance may exist with spatially nonuniform but temporally constant illumination. This condition occurs quite commonly, since the illumination is generally not perfectly uniform. It is modelled by:

$$I(x,t) = L(x) R(x,t) \quad (7)$$

and $$I(x,t-\tau) = L(x) \cdot R(x+D,t) \quad (8)$$

and therefore, $$I(\underline{x},t) = \frac{L(x)}{L(\underline{x}-\underline{D})} \cdot I(\underline{x} - \underline{D}, t-\tau) \quad (9)$$

or alternatively $$I(\underline{x},t) = \frac{R(x,t)}{R(\underline{x}+\underline{D},t)} \cdot I(\underline{x}, t-\tau). \quad (10)$$

Third, translational displacement of illumination may exist with spatially nonuniform but temporally constant reflectance. This situation is the dual of the second case above and can be caused by a shadow created in the background by a moving object. It is modelled by:

$$I(x,t) = L(x,t) R(x) \quad (11)$$

and $$I(x,t-\tau) = L(x+D,t) \cdot R(x). \quad (12)$$

and therefore, $$I(\underline{x},t) = \frac{R(x)}{R(\underline{x}-\underline{D})} \cdot I(\underline{x} - \underline{D}, t - \tau) \quad (13)$$

or alternatively $$I(\underline{x},t) = \frac{L(x,t)}{L(\underline{x}+\underline{D},t)} \cdot I(\underline{x}, t - \tau). \quad (14)$$

The preceding three cases each exhibit a multiplicative factor which may vary spatially and from frame to frame to account for intensity changes in the picture. This phenomenon can be generalized to redefine equation (1) as $$I(x,t) = \rho_1 I(x, t-\tau) \quad (15a)$$

and $$I(x,t) = \rho_2 I(x-D, t-\tau). \quad (15b)$$

Equations (15a) and (15b) are alternative models of frame-to-frame intensity variations, with equation (15b) taking account of object displacement and (15a) assuming a stationary picture. However, these models are not equivalent alternatives, since, in a real television scene, different parts of the picture change in different ways. These parts must first be identified, and then compensated for, by appropriately estimating not only D as in the aforesaid prior art, but also the variables $\rho_1$ and $\rho_2$, called "gain factors". The relationship of equations (15a) and (15b) is explained further below.

In order to fully appreciate the manner in which the gain factors are computed in an interframe coder, the manner of processing and the notation for representing a video signal must be understood. Referring to FIG. 1, rectangle 101 represents the outer boundaries of a present frame of the picture being processed, and rectangle 151 represents the boundaries of a previous frame of the same picture. Arrow 191 represents the direction in which time is proceeding, illustrating that frame 101 follows frame 151. Under most conditions, processing in accordance with the present invention occurs on a frame-to-frame basis, with $\tau$ representing the time between frames, usually 1/30th second. However, under some conditions where low resolution is acceptable, some frames can be skipped, so that the time between frames used for processing purposes can be $n\tau$, where n is an integer.

Within each frame, a series of scan lines (102–104 in frame 101 and 152–154 in frame 151) represent the paths over which the original picture or image is scanned to generate the electrical signal which represents the picture. Each frame is normally scanned from left to right and from top to bottom, with 525 scan lines/frame being typical. In some instances, however, interlaced field scanning is used, whereby a first set of 263 scan lines is formed (usually in 1/60th of a second) and then a second set of 262 interlaced scan lines (shown dotted in FIG. 1) is formed; the spatial position of a scan line in a field is in the middle of the spatial position of scanning lines in either of its two adjacent fields. Where interlace scanning is used, the present invention will generally operate on alternate fields (e.g., odd fields), so that picture elements in identical spatial locations are available. The remaining fields are processed identically. As an example, if the fields are consecutively numbered 1, 2, 3 ... n, n+1, n+2, ... N, field n+2 is processed using predictors formed from field n. Field n+3 is processed using predictors from field n+1.

Within each of the frames 101, 151 of FIG. 1, circles 110–116 and 160–166 represent, respectively, the locations of picture elements (pels) which correspond to instants at which the video signal is sampled. Specifically, in frame 101, pels 114–116 lie along scan line 103, and pels 110–113 lie along the preceding scan line 102. For notation purposes, pel 116 is considered the presently processed pel, and is designated pel z; the preceding pel 115 on the same scan line is designated pel y, and pel 114 is designated pel w. The pel 112 on the scan line 102 preceding the present scan line 103 which is directly above the presently processed pel is designated pel c, with the preceding two pels 110, 111 designated pels a and b, respectively. The pel 113 following pel c is designated pel d. Using this notation, the intensity value of the presently processed pel is $I_z$, the intensity value of the immediately preceding pel is $I_y$, the intensity value of the pel delayed one line interval from the present pel is $I_c$ and so on. These latter designations, it is to be understood, represent only the relative spatial positions of some of the pels in a frame. As processing proceeds, each pel will become the "presently processed pel z" and pels a–d, w and y will have the same relative spatial positions as shown in FIG. 1.

In the previous frame 151, the letter designations of the pels corresponding to those in frame 101 are the same. However, a bar "‾" is placed over each letter to distinguish the time delay by $\tau$, the interframe delay time. For example, the intensity value for the pel in the previous frame which spatially corresponds to the presently processed pel is $I_{\bar{z}}$ and the intensity value for the pel in the corresponding location of pel c in frame 101 is denoted $I_{\bar{c}}$.

The foregoing form of notation, it will be understood, is a shorthand manner of expression equivalent to a longer form used in some of the above-cited prior applications. For example, $I_c$, the intensity value at pel c in the present frame, can also be denoted $I(\underline{x}_c,t)$. Similarly, the intensity value $I_{\bar{z}}$ of pel z in the previous frame can also be written $I(\underline{x}_z,t-\tau)$. The longer form of notation is especially useful in cases where it is desired to represent the intensity at a displaced location which does not correspond exactly to a point at which the video signal is sampled. For example, the intensity (at time $t-\tau$) at the location displaced from the location of pel d by the displacement vector $\underline{D}$ is given by $I(\underline{x}_d-\underline{D},t-\tau)$.

Returning to the previous discussion of the gain factors defined in equations (15a) and (15b), it is to be noted that equation (15a) is significantly easier to implement since spatial interpolation is not required. Also, a simple delay element can be used and a random access memory is not required. These advantages accrue because $\rho_1$ is a multiplicative factor which permits prediction of the intensity of a given location in the present frame using the intensity of the <u>same</u> location in a previous frame. By way of contrast, $\rho_2$ is a multiplicative factor which permits prediction of the intensity of a particular location in the present frame using the intensity for a <u>displaced location</u> in the previous frame. That intensity is obtained by recalling, usually from a random access memory, intensity values of pels in the neighborhood specified by the integral portion of the displacement vector, and then interpolating to compute the intensity at the exact location specified by the fractional portion of the displacement vector.

In accordance with the present invention, the values of $\rho_1$ and $\rho_2$ are calculated recursively, based upon previously computed values of those values, so that $\hat{\rho}_1$ and $\hat{\rho}_2$, the <u>estimated</u> values of those variables ideally converge upon the respective true values. The recursion relationships are as follows:

$$\hat{\rho}_1{}^{i+1} = \hat{\rho}_1{}^i + \epsilon_1[I(\underline{x},t) - \hat{\rho}_1{}^i I(\underline{x},t-\tau)]I(\underline{x},t-\tau) \qquad (16)$$

$$\hat{\rho}_2{}^{i+1} = \hat{\rho}_2{}^i + \epsilon_1 DFD(\underline{x},\hat{\rho}_2{}^i,\underline{\hat{D}}^i)\cdot I(\underline{x}-\underline{\hat{D}}^i,t-\tau). \qquad (17)$$

In equation (17), $\hat{D}^i$ is itself defined using the recursion:

$$\hat{D}^{i+1} = \hat{D}^i - \epsilon_2 \rho_2{}^{i+1} DFD(\underline{x},\hat{\rho}_2{}^{i+1},\underline{\hat{D}}^i)\nabla I(\underline{x}-\underline{\hat{D}}^i,t-\tau). \qquad (18)$$

Equation (16) indicates that each calculation of $\hat{\rho}_1{}^{i+1}$, the current estimate of the gain factor $\hat{\rho}_1$, is derived from the previous estimate $\hat{\rho}_1{}^i$ and adds a correction term which is the product of:

(a) $\epsilon_1$, a scaling constant, generally having a value $10^{-5} < \epsilon_1 < 10^{-2}$;

(b) The intensity differences (error) between the presently processed pel (location x) in the present frame (time t) and $\hat{\rho}_1{}^i$ times the intensity of the same location in the previous frame; and (c) The intensity value of the presently processed pel in the previous frame.

Figure 2:
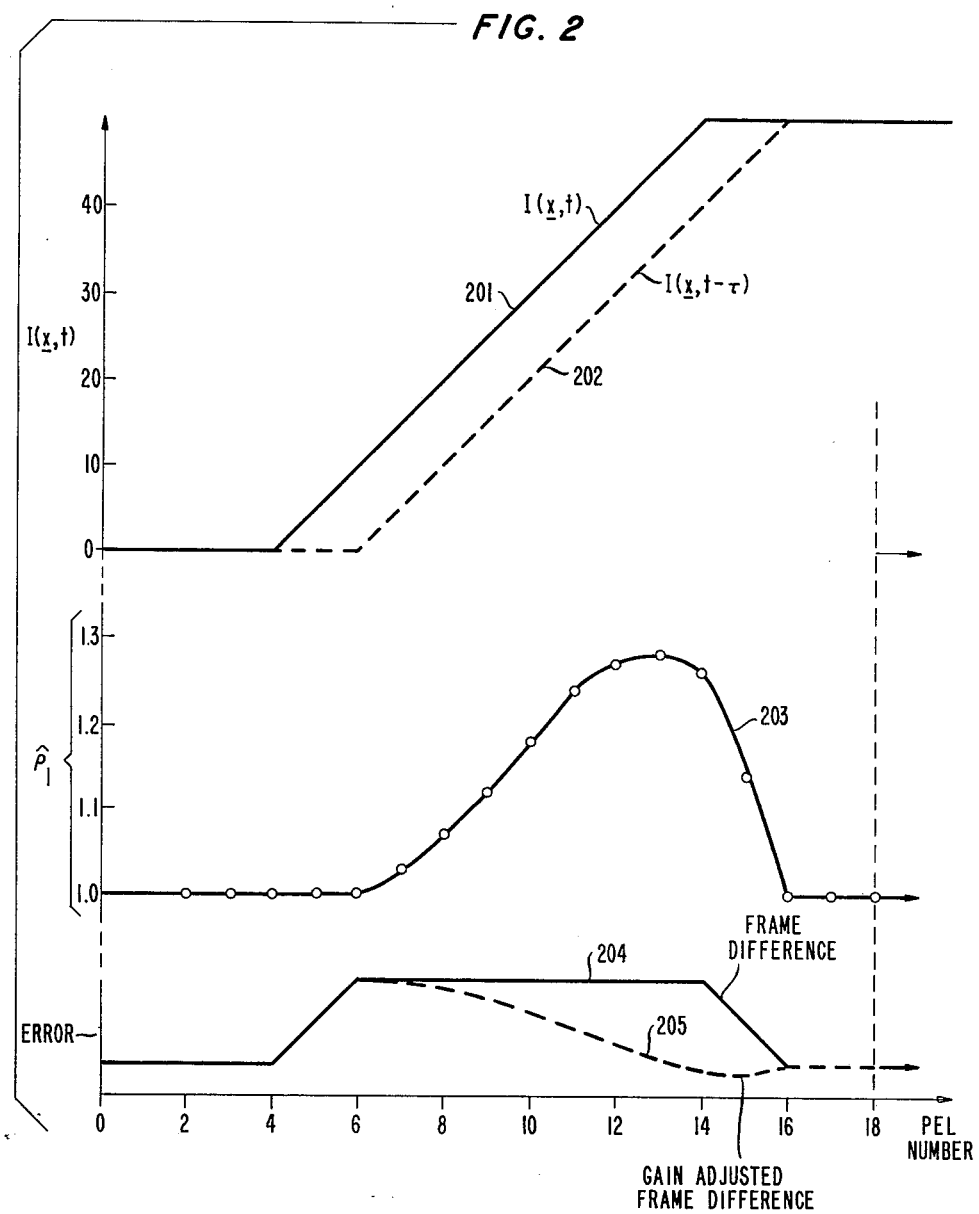
FIG. 2 illustrates how an intensity edge is processed in accordance with the present invention.

The second factor (b) also uses the previous estimate $\hat{\rho}_1{}^i$, and this factor can be considered the error (GDIF) between the true intensity value of a pel and a gain adjusted predicted value thereof obtained by multiplicatively adjusting the previous frame value for the same pel by a gain factor $\rho_1$. It is to be noted here that implementation of equation (16), to be described more fully hereinafter, can use a delay element with a fixed delay interval $\tau$, and does not require spatial interpolation, since displacement in the picture is not considered directly. However, equation (15a) can indeed provide an approximation to object motion, and can sometimes be used to compensate for intensity variations caused by object translation or motion. This property is illustrated in FIG. 2, which shows an inclined intensity edge 201 in the present frame which is displaced by two picture elements from the same edge 202 in the previous frame. When the recursion relationship of equation (16) is applied to this intensity data, the estimates for the gain factor $\hat{\rho}_1$ are shown in curve 203. Also shown in FIG. 2 are the comparative results of predictions made with and without adjustment of the frame difference by the gain factor. Specifically, curve 204 shows that the prediction error $$FDIF(\underline{x},t) = I(\underline{x},t) - I(\underline{x},t-\tau) \qquad (19)$$

for previous frame prediction without gain adjustment results in significantly higher error than in curve 205, which represents the prediction error (gain adjusted frame difference)

$$GDIF(\underline{x}_1,\hat{\rho}_1,t) = I(\underline{x},t) - \hat{\rho}_1 \cdot I(\underline{x}_1,t-\tau) \qquad (20)$$

using gain adjustment in accordance with this invention.

The $\rho_2$ gain factor defined in equations (15b) and (17), unlike $\rho_1$ just discussed, is affected by the displacement estimate $\underline{\hat{D}}$, which itself is recursively calculated in accordance with equation (18). From equation (17), it is seen that $\hat{\rho}_2^{i+1}$, the present estimate of this gain factor, is the sum of the previous estimate, $\hat{\rho}_2^i$, and an error or update term which is the product of:

(a) $\epsilon_1$, the scaling coefficient defined previously;

(b) $DFD(\underline{x}_1,\hat{\rho}_2^i,\underline{\hat{D}}^i)$, which is expressed as $I(\underline{x},t) - \hat{\rho}_2^i \cdot I(\underline{x}-\underline{\hat{D}}_1,t-\tau)$, and is the displaced frame difference evaluated using the intensity at location x in the present frame, the intensity at location $\underline{x}-\underline{\hat{D}}^i$ in the previous frame, and using $\hat{\rho}_2^i$ as the gain factor for the latter intensity value; and (c) the intensity $I(\underline{x}-\underline{\hat{D}}^i,t-\tau)$ at the displaced location in the previous frame. As stated previously, to implement equation (18), interpolations are necessary in order to calculate the displacement estimate $\underline{\hat{D}}$ and the intensity at the displaced location.

Figure 3:
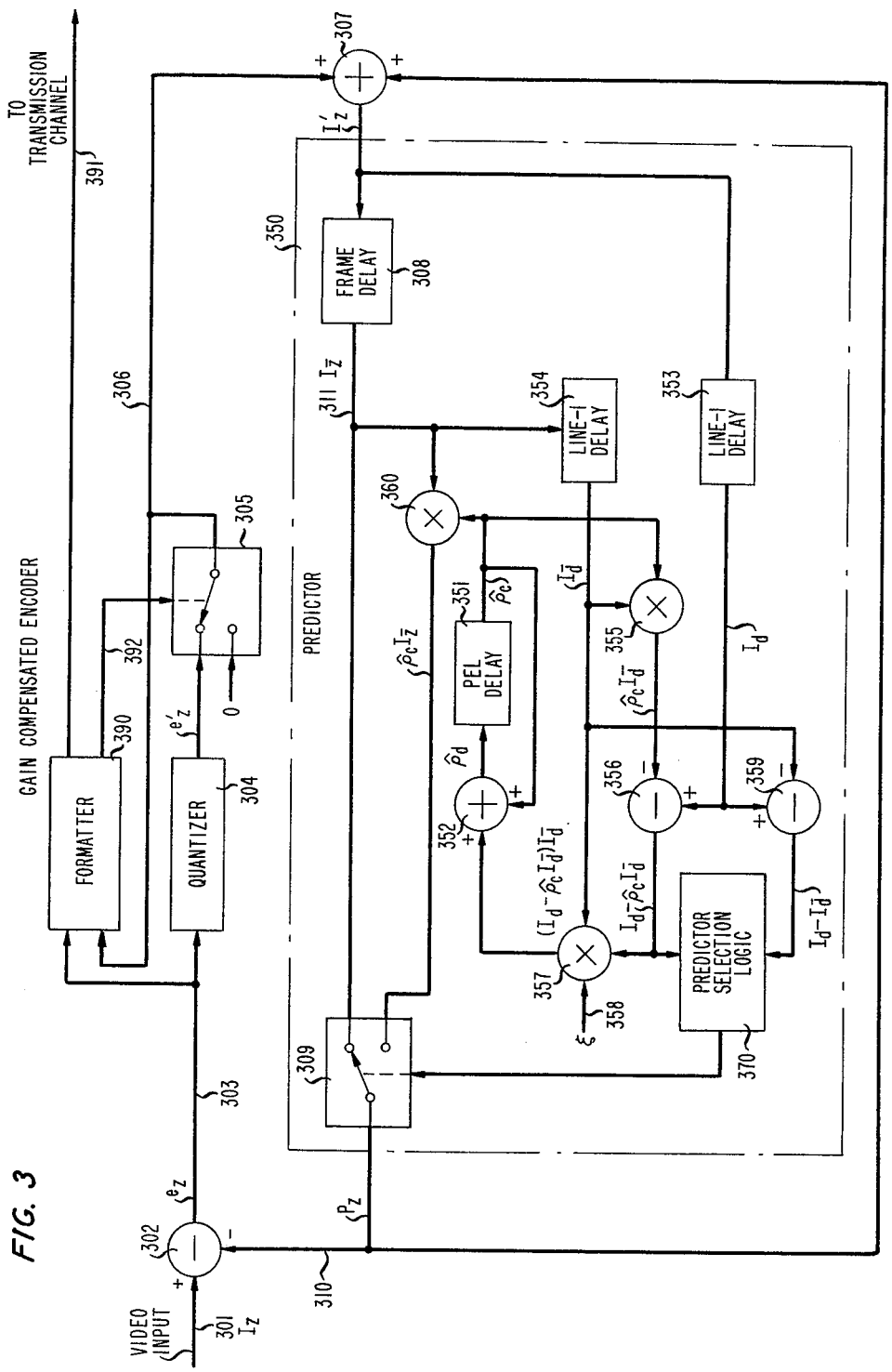
FIG. 3 is a block diagram of a predictive encoder constructed in accordance with the present invention to use a recursive gain factor in the intensity value representation.

One embodiment of the present invention, arranged to encode a series of samples which represent the intensity values of elements in a picture using either a simple previous frame predictor (of the type used in conditional replenishment) or a gain adjusted prediction in accordance with equation (15a), is shown in block diagram form in FIG. 3. The input to the encoder on line 301 is a series of samples usually obtained by scanning an image or a picture in a manner as described with respect to FIG. 1, and sampling the scanner output at a desired rate, usually 1 MHz. Inputs can, however, be derived from other sources, such as from a computer memory, as long as the samples are arranged to represent the picture in an ordered sequence such as line by line and frame by frame.

The input sample $I_z$, representing the intensity of the present pel z, is applied to one input of a subtractor circuit 302, the other input of which is the final predicted intensity value $p_z$ of the same pel, generated as discussed below. The prediction error $e_z$ output from subtractor 302 on line 303 is applied to a quantizer 304 which may have a desired non-linear characteristic matched to the expected statistical properties of the signals being processed. Design of such quantizers has been extensively studied, and the manner of selection of an appropriate quantizer will be apparent to those skilled in the art. The quantized error signal $e_z'$ output from quantizer 304 is applied to one input of a switch 305, the position of which is controlled by a formatter 390, to be described hereinafter. When the formatter determines that the error value exceeds a predetermined threshold, switch 305 is maintained in the position shown in FIG. 3, and the value $e_z'$ is output on line 306 and applied to formatter 390 and to one input of an adder circuit 307. On the other hand, when the error is small, it is assumed that the predicted value is satisfactory for subsequent decoding. In this event, switch 305 is repositioned to supply a "zero" to line 306. Formatter 390, besides performing the thresholding of $e_z$, is used for encoding the addresses and error values of unpredictable picture elements. The output of formatter 390 on line 391 forms the output of the encoder.

The error signal ($e_z'$ or zero) that is output from switch 305 is recombined in adder circuit 307 with the final predicted intensity value $P_z$ on line 310 to form a reconstructed intensity value $I_z'$ for the present pel, and this value is entered in a frame delay circuit 308, which may comprise a delay line or like storage element. Delay circuit 308 is arranged to provide a delay time $\tau$ equivalent to one frame interval, so that as the reconstructed intensity value $I_z'$ for the present pel (pel z) is being input to the delay circuit, the intensity value $I_{\bar{z}}$ for the same pel but in the previous frame is being output on line 311. This intensity value is coupled to line 310 and is the final predicted value $p_z$, provided that switch 309 remains in the position shown in FIG. 3. In this position, the output of subtractor 302 is the frame difference for pel z, and neither displacement nor gain compensation is involved. In this mode, it will be recognized that the encoder is acting as a conditional replenishment (previous frame) encoder typical of the prior art.

In accordance with the present invention, in addition to the previous frame prediction just described, a gain adaptive prediction is also formed by the predictor designated generally at 350, which multiplicatively adjusts the previous frame prediction by the gain adjustment factor $\rho$. Predictor 350 also includes predictor selection logic 370 which is arranged to select the best prediction mode by appropriately controlling the position of switch 309. Predictor 350 includes delay elements and algebraic circuits (adders and multipliers), but spatial interpolation is not required, and the logic is thus not complicated.

Two assumptions are made with respect to the processing used in predictor 350, in order to simplify processing and eliminate the need to encode the magnitude of the prediction error and the location of the pel being processed when the prediction error is small. First, it is assumed that the gain factor $\hat{\rho}_c$ for pel c, the element immediately above the presently processed pel z, will be substantially equal to the value $\hat{\rho}_z$ of the gain factor for pel z, so that $\hat{\rho}_c$ and not $\rho_z$ is computed. Second, it is assumed that selection logic 370 can determine which predictor is "best" by comparing the frame difference for pel d with the gain adjusted frame difference for pel d, again rather than computing the same quantities for pel z. These assumptions have been evaluated via simulation, and have been found to produce satisfactory results. Nevertheless, it may sometimes be advantageous to modify the circuitry of FIG. 3 by adding appropriate delay elements to compute the desired functions for pel z and not for nearby pels c and d. In this case, formatter 390 must be modified accordingly.

Using equation (16), it is seen that the gain factor $\hat{\rho}_d$ for pel d is given by $\hat{\rho}_c+\epsilon(I_d-\hat{\rho}_c I_{\bar{d}})I_{\bar{d}}$. Assuming that $\hat{\rho}_c$ is stored in a delay element 351 having a delay time of one sample interval, the value $\hat{\rho}_d$ of the gain factor for the next pel is obtained recursively by applying the appropriate correction term to one input of adder circuit 352, the other input of which receives $\hat{\rho}_c$ from delay element 351. The quantities needed to compute the update term are obtained by applying the input and output of frame delay 308 to delay elements 353 and 354, respectively, each of which are arranged to provide a delay interval which equals one scan line interval less one sample interval. With this delay, the output of delay element 353 is $I_d$, the intensity of element d in the present frame, while the output of delay element 354 is $I_{\bar{d}}$, the intensity for the same pel in the previous frame.

The product $\hat{\rho}_c I_{\bar{d}}$ is obtained by multiplying the outputs of delay elements 351 and 354 in a multiplier 355, and that product is subtracted from the output of delay element 353 to yield $I_d-\hat{\rho}_c I_{\bar{d}}$ at the output of subtraction circuit 356. This difference is supplied to first inputs of selection logic 370 and of a second multiplier 357, the latter also receiving $I_{\bar{d}}$ from delay element 354. The output of multiplier 357, attenuated by the scaling factor $\epsilon$, input on line 358, is the desired gain factor update term, which is added to $\hat{\rho}_c$ in adder circuit 352.

Selection logic 370, as stated previously, is intended to determine which prediction mode, i.e., previous frame (conditional replenishment) or gain adjusted previous frame, is best, depending on the relative magnitudes of the prediction errors for each type of prediction. For previous frame prediction, the frame difference $I_d-I_{\bar{d}}$ is obtained from subtractor 359, which subtracts the output of delay element 354 from the output of delay element 353. For gain adjusted prediction, the prediction error is the output from subtractor 356, and this value is coupled to the second input of selector 370. In one embodiment, selector 370 can include a simple comparator arranged to control the position of switch 309, such that the previous frame prediction $I_{\bar{z}}$ from delay circuit 308 is used as the final prediction $p_z$ if the error associated with that prediction is smaller than the prediction error using gain adjustment. On the other hand, the gain adjusted prediction $\hat{\rho}_c I_{\bar{z}}$ is used as the final prediction $p_z$ if that prediction is better. This latter quantity is computed by multiplying the intensity value $I_{\bar{z}}$ by the gain factor output from delay element 351, using multiplier 360. The output of multiplier 360 is applied to one input of switch 309, and the output of delay circuit 308 is applied to the other switch input.

Figure 4:
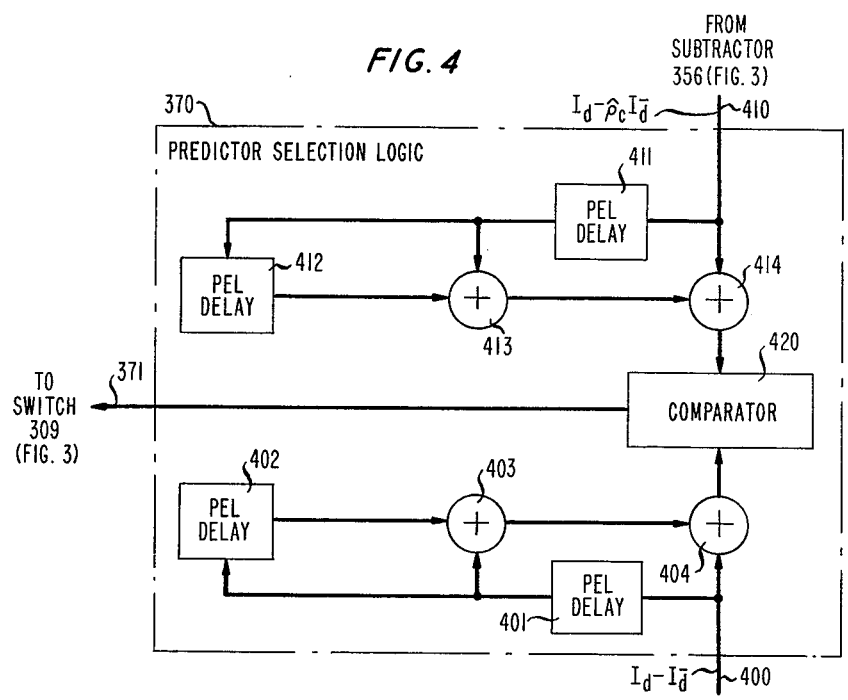
FIG. 4 is a block diagram of the predictor selection logic 370 of FIG. 3.

Selection logic 370 can compare the gain compensated and uncompensated error values for <u>several</u> pels in making a decision as to which prediction is best, if it is desired to introduce some hysteresis in the selection process. In this event, the circuitry of FIG. 4 can be used. The error value $I_d-I_{\bar{d}}$ for uncompensated (simple frame difference) prediction obtained from subtractor 359 of FIG. 3 is applied to a serially connected pair of one pel delay circuits 401 and 402, the outputs of which are combined with the present error value on line 400 by adder circuits 403 and 404. The overall sum, computed using only the magnitudes (and not the signs) of the error values for pel d and the preceding pels b and c, is applied to one input of comparator 420. In a similar fashion, the gain compensated prediction error $I_d-\hat{\rho}_c I_{\bar{d}}$ obtained from subtractor 356 of FIG. 3 is applied to a second serially connected pair of one pel delay circuits 411 and 412. The outputs of these circuits are combined with the present compensated error value on line 410 in adder circuits 413 and 414. The overall sum, again computed using magnitudes only, is obtained from adder 414 and applied to the second input of comparator 420, which controls the position of switch 309 of FIG. 3 via a control output on line 421.

The quantized prediction error values $e_z'$ output from quantizer 304 of FIG. 3 are derived, as explained above, from gain compensated or previous frame prediction, whichever is "best". In accordance with one embodiment of the present invention, even this "best" error value need not always be encoded and transmitted to the receiver. Rather, the magnitude of the error value is compared to a preselected threshold value T. When the threshold is exceeded, both the error value and its location (address) are encoded. Otherwise, neither address nor error information is encoded, since the receiver can adequately reconstruct the original signal. The comparison and encoding functions are performed in formatter 390 of FIG. 3, shown in more detail in FIG. 5. The unquantized error value $e_z$ from subtractor 302 is applied to one input of comparator 501 and compared with the value of T. When the threshold is exceeded, a high control signal on line 392 is used to close switch 305, thereby coupling the quantized error value $e_z'$ back to the formatter on line 312. This error value is advantageously applied to a variable length encoder 504, the output of which is stored in a first in-first out (FIFO) buffer 505 before application to a transmission channel. Encoder 504 may be a conventional Huffman encoder arranged to use shorter code words for more frequently occurring input values, so as to again effect bandwidth compression.

The output of comparator 501 is also applied to an exclusive OR gate 506 directly and via a flip-flop 507 which acts as a one sample delay element, in order to detect transitions in the output of comparator 501. Each transition is used to start a counter within a run length coder 508, and to transfer the length of the preceding run or segment to a pair of read-only memories 509 and 510, each of which store code dictionaries for the run length codes. If the output of comparator 501 is low, indicating a "predictable" segment or run, switch 511 is maintained in the position shown, thereby coupling a code word from ROM 509 back to encoder 508. Alternatively, if the comparator 501 output is high, indicating an unpredictable segment or run, switch 511 is repositioned coupling a code word from ROM 510 to encoder 508. Separate code dictionaries are advantageously used for predictable and unpredictable segments since different statistical properties are expected for each group, with predictable runs being longer, in general. The code words returned to encoder 508 from switch 511 are appropriately timed and coupled to a second FIFO buffer 512.

Figure 5:
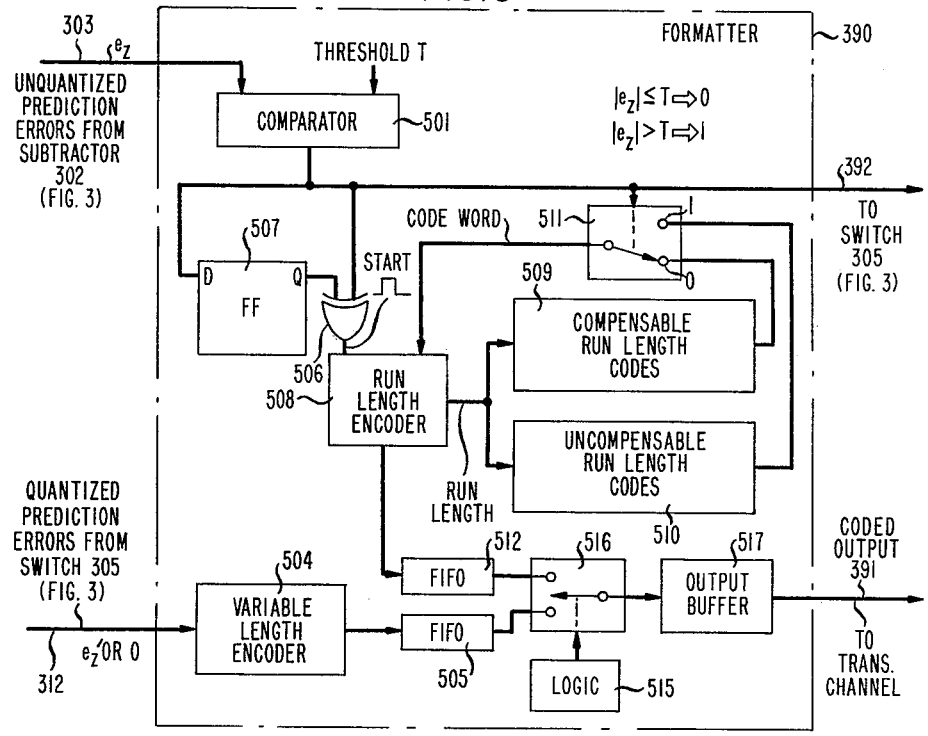
FIG. 5 is a block diagram of formatter 390 of FIG. 3.

The formatter of FIG. 5 also includes a logic circuit 515 which selectively couples the outputs of FIFO buffers 505 and 512 to an output buffer 517 depending upon the position of switch 516. Logic 515 is arranged so that address information for predictable and unpredictable pels alternate, and each code word for a run of predictable pels is followed by the error values for those pels. Error values for predictable pels are not transmitted with the address information, since the intensities of these pels are adequately reconstructed in the receiver without error data.

Figure 6:
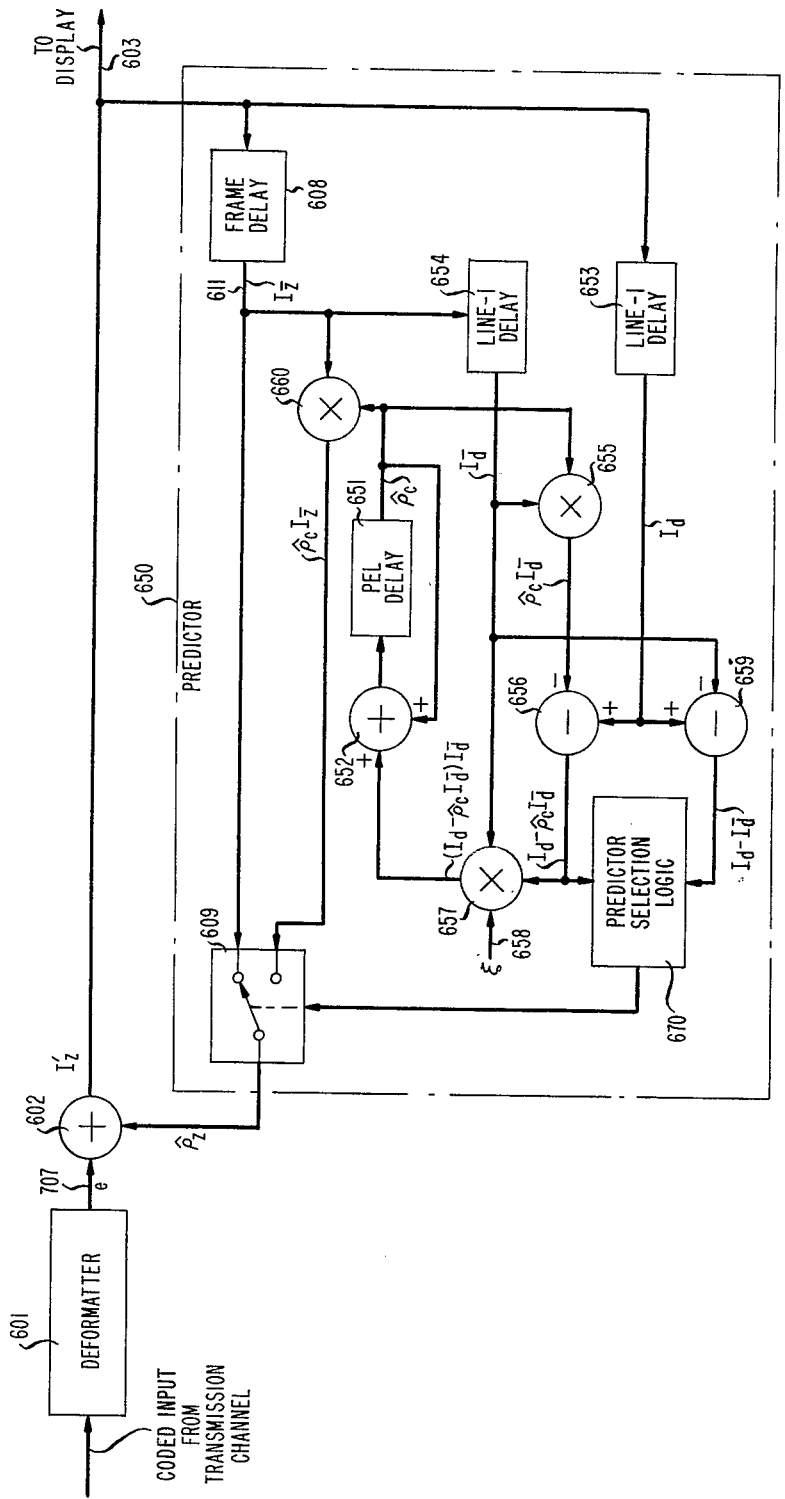
FIG. 6 is a block diagram of a decoder which may be used to recover the video information encoded with the apparatus of FIG. 3.

Encoded signals output from the encoder of FIG. 3 may be reconstructed in the decoder of FIG. 6, which includes a deformatter 601 which is shown in detail in FIG. 7. The deformatter stores coded incoming data in an input buffer 701, which supplies variable length codes for predictable error values to a variable length decoder 702 and run length codes for address information to a run length decoder 603, depending upon the position of a switch 704. Logic 705 alternates the switch position such that error values for unpredictable segments follow the length codes for those segments, and so that length codes for predictable and unpredictable segments alternate. Each decoder 702 or 703 performs the inverse function as compared to encoders 504 and 508, respectively, of FIG. 5. The error values ê output from decoder 702 are assembled in register 715 and then applied to one input of adder 602 of FIG. 6 via line 707 when switch 706 is closed. This occurs for unpredictable pels.

The received run length code words applied to decoder 703 are converted to bit strings of the decoded run length by ROM's 708 and 709, which perform the inverse function of ROM's 509 and 510 of FIG. 5. At the start of each run, decoder 703 provides a start pulse on line 710 to toggle flip-flop 711. With a high toggle output, the length of the run is extracted from ROM 708, since switch 712 maintains the position shown in FIG. 7. Simultaneously, switch 706 connects the error values for each pel to line 707. At the start of the next run or segment, flip-flop 711 is toggled; for this segment, measured by the string of bits output from ROM 709, switch 706 remains open, since error values for predictable pels were not encoded. The outputs of ROM's 708 and 709 are fed back to decoder 703 to enable generation of the start pulse on line 710.

The sum of the error values e output from deformatter 601 on line 707 and the predicted value $p_z$ generated by the remaining circuitry of FIG. 6 is formed in adder 602 and made available on output line 603. This output can be displayed or stored for further processing or future use. The remaining circuitry within predictor 650 is the same as that used in the encoder of FIG. 3. For completeness, its operation is briefly summarized.

The recovered intensity value $I_z'$ on line 603 is input to a frame delay circuit 608 which provides a delay of one frame interval between its input and its output on line 611. The output of delay circuit 608 is the previous frame prediction $I_{\bar{z}}$, which is applied to one input of switch 609. The gain adjusted prediction is calculated recursively, as in the encoder, by storing the value of the gain factor $\hat{\rho}_c$ in delay element 651 and by recursively adding an update term via adder 652. The update term, given by equation (16) is computed by (a) delaying the output of frame delay 608 by one line interval less one sample interval in element 654 to obtain $I_{\bar{d}}$; (b) multiplying $I_{\bar{d}}$ by $\hat{\rho}_c$ in multiplier 655; (c) obtaining $I_d$ by delaying $I_z$ by one line interval less a sample interval in delay element 653; (d) forming the difference $I_d - \hat{\rho}_c I_{\bar{d}}$ in subtractor circuit 356; and (e) generating the product of $I_{\bar{d}}$, the scaling factor $\epsilon$ on line 658, and $I_d - \hat{\rho}_c I_{\bar{d}}$ in multiplier 657. As in the encoder of FIG. 3, the decoder also includes predictor selection logic 670 which compares the prediction errors using gain adaption (from subtractor circuit 656) and using previous frame prediction (from subtractor 659) to appropriately position switch 609.

While the video encoding technique just described (using two types of prediction) considerably improves the prediction for picture elements in areas of the picture where the illumination is changing spatially or temporally, it is often found that different areas of the picture involve different types of activity. For example, in a head and shoulders view, the background may be stationary, the head moving slowly and the lips rapidly, with some or all of the scene undergoing variations in illumination. To account for these differences, yet other types of predictors can be evaluated, with the encoder arranged to select and switch to the "best" predictor. To this end, a video encoder arranged to select the best of four possible predictions is shown in block diagram form in FIG. 8. The four predictions $p_1-p_4$ generated in a predictor designated generally at 800, are defined as follows: (1) $p_1 = I(\underline{x}, t-\tau)$ is based on the intensity of the corresponding pel in the previous frame; (2) $p_2 = \hat{\rho}_1{}^c (I(\underline{x}, t-\tau))$ is a gain adaptive prediction using the corresponding pel in the previous frame, just as in the encoder of FIG. 3 described above; (3) $p_3 = I(\underline{x} - \hat{\underline{D}}_1{}^c, t-\tau)$ is displacement compensated prediction of the kind described in the aforesaid application Ser. No. 46,953; and (4) $p_4 = \hat{\rho}_2{}^c I(\underline{x} - \hat{\underline{D}}{}^c, t-\tau)$ is a gain and displacement compensated prediction described in equation (15b).

Figures 8, 10:
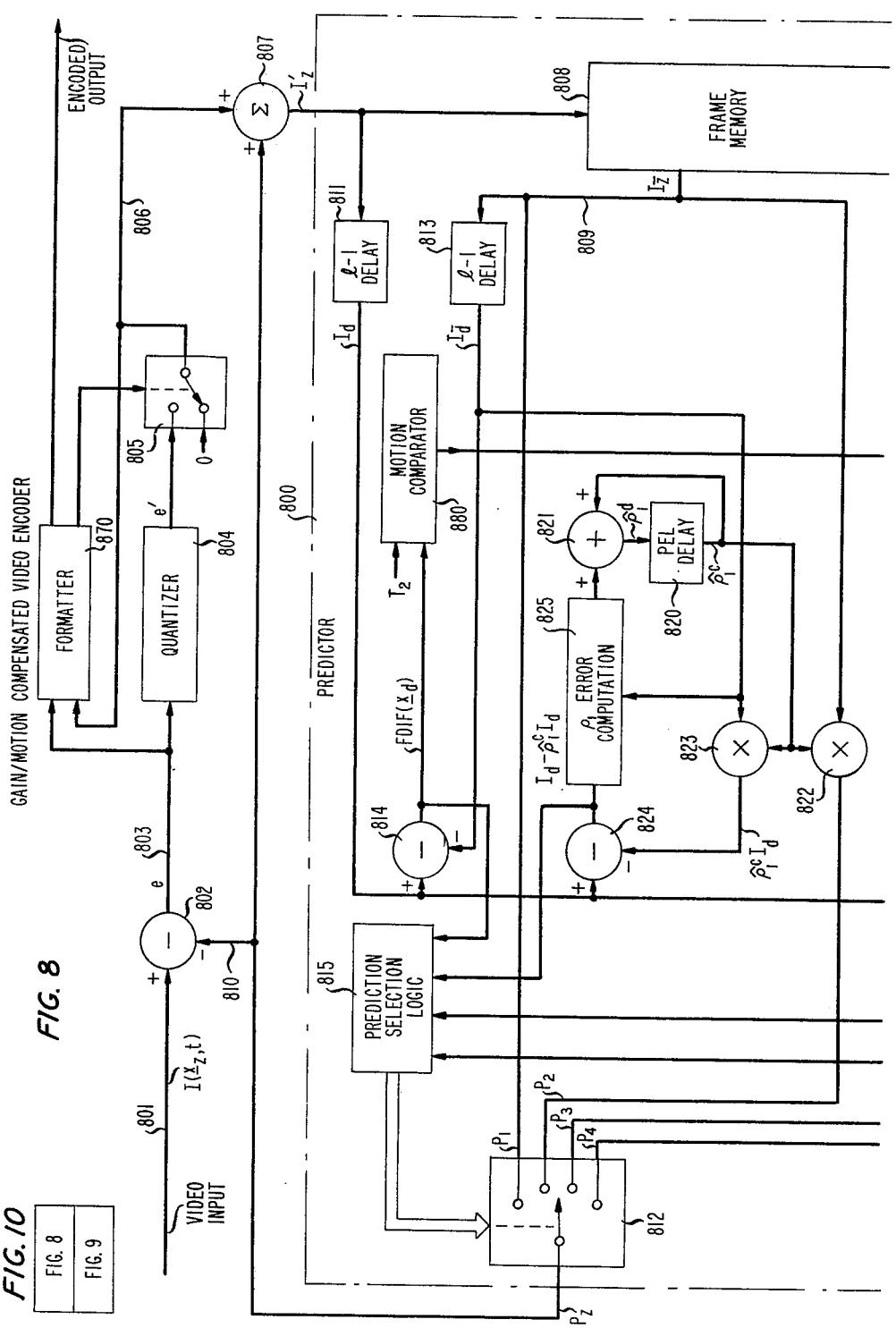

In FIG. 8, the input video signal on line 801 is compared in subtractor 802 with the final predicted intensity value $p_z$ generated by predictor 800 on line 810, to yield an error value e on line 803. This error value is applied to a formatter 870 and to a quantizer 804, which generates a quantized error e'. Formatter 870, like formatter 390 of FIG. 3, compares the error e to a threshold value T and appropriately controls the position of switch 805. If the error is small, the predicted value is considered good, and switch 805 is positioned so as to couple a "zero" back to formatter 870 and also to one input of adder 807 via line 806. If the error is large, e', the quantized error value, is applied to line 806 and thence to adder 807. e' is also returned to formatter 810, which like the formatter previously described, encodes the addresses of predictable and unpredictable pels and the error values for the latter pels only.

The second input to adder 807 is the final predicted value $p_z$ derived from line 810, which is the "best" prediction formed by predictor 800. The output of adder 807 is the reconstructed version $I_z'$ of the intensity value presently being processed. This value is written in a frame memory 808, and applied to a delay element 81 having a delay time of one scan line interval less one sample interval. Frame memory 808 can be a random access memory or other similar addressable storage device arranged to provide a nominal delay time $\tau$ of one frame interval, but which can also be controlled to provide stored intensity values in the neighborhood of a specified picture location.

The first prediction $p_1$ is a previous frame prediction obtained using the frame delayed intensity value $I_z$ of the pel corresponding to the presently processed pel. This intensity value is output from memory 808 on line 809 and applied to one input of a multi-position switch 812. For this prediction, memory 808 may be arranged to provide a delay time $\tau$ between its input $I_z'$ and the output $I_{\bar{z}}$ on line 809. The error for the previous frame prediction is evaluated by calculating the frame difference for pel d, which lies on the preceding scan line and one sample to the left of pel z. Pel d is used in lieu of pel z to allow sufficient processing time for selection of the best prediction. To obtain the frame difference for pel d, the input to and output from memory 808 are applied to delay elements 811 and 813, respectively, each of which have delay times equivalent to one line interval less one sample interval. The difference between the respective outputs $I_d$ and $I_{\bar{d}}$ is obtained in a subtractor 814, the output of which is extended to one input of predictor selection logic 815. This logic evaluates the prediction error associated with each of the predictions and appropriately positions switch 812 to select the "best" prediction, i.e., the one having the smallest prediction error.

The second intensity prediction $p_2$ is obtained using a gain compensation factor $\hat{\rho}_1{}^c$ exactly as in the encoder of FIG. 3. The subscript "1" is used to distinguish the present gain factor from another gain factor $\hat{\rho}_2$, described subsequently, which is used concurrently with motion compensated prediction. The superscript "c" indicates that the factor is calculated with respect to pel c. The same assumption is made here as was previously discussed, i.e., that the factor for pels c and z are so similar that the former can be used in lieu of the latter. If more computational capability is available, this assumption need not be made.

The present value of the gain factor $\hat{\rho}_1{}^c$ is stored in a one sample delay element 820 and is recursively updated by adding a correction term using adder 821. The prediction $p_2$ is obtained by forming the product of $\hat{\rho}_1{}^c$ and $I_{\bar{z}}$ in multiplier 822, the output of which is coupled to switch 802. To compute the update term, the product $\hat{\rho}_1{}^c I_d$ is formed in multiplier 823 and subtracted from $I_d$ in subtraction circuit 824. The update term is then obtained in computation circuit 825, which multiplies the output of circuit 824 by $I_{\bar{d}}$ (received from delay element 813) and by the scaling factor $\epsilon$, stored internally. The output from subtractor 824 is the prediction error associated with prediction $p_2$, and this value is applied to a second input of selection logic 815.

The third prediction $p_3$ is obtained using only displacement compensation, exactly as in the prior application Ser. No. 21,077. To compute this prediction, the displacement vector $\hat{D}_1{}^d$, for pel d is calculated recursively, using information about the preceding displacement estimate $\hat{D}_1{}^c$ for pel c. The subscript "1" is used to distinguish this displacement estimate from another estimate $\hat{D}_2$, discussed below, used with gain and motion compensated prediction $p_4$.

In this portion of predictor 800, $\hat{D}_1{}^c$ is stored in a one pel delay element 830, and an update is added thereto using adder 831. The displacement update is formed in a computation circuit 832, the output of which is applied to adder 831 only when switch 833 is closed. As explained in the aforesaid application, displacement estimates are updated only in moving areas of the picture. For this reason, the frame difference output from subtraction circuit 814 is compared with a threshold value $T_2$ in a motion comparator 880. If the threshold is exceeded, indicating a moving area, switch 833 is closed. Otherwise, a zero is coupled through to adder 831, indicating that the displacement value is not updated.

The integral portion (denoted $[\hat{D}_1{}^c]$) of the displacement estimate $\hat{D}_1{}^c$ is obtained by connecting the output of delay element 830 to a quantizer 834; the fractional portion $\hat{D}_1{}^c - [\hat{D}_1{}^c]$ is obtained by determining the difference between the quantizer input and output in a subtraction circuit 835. The integral portion is applied to the read address input of memory 808 on line 836, which is arranged to provide on lines 837 the stored intensity values which correspond to the spatial location indicated by the displacement estimate. These intensity values are applied to an interpolator circuit 838, which also receives the fractional portion of the displacement value. Interpolator 838, which may include one or more weighted average circuits, computes the intensity value at the displaced location $(\hat{x}_z - \hat{D}_1{}^c)$. This value, $I(\underline{x}_z - \hat{D}_1{}^c, t - \tau)$, is output from interpolator 838 on line 839 and is the third prediction $p_3$ applied to switch 812.

Memory 808 is also arranged to supply the stored intensity values which correspond to the spatial location displaced from the location of pel d by a distance indicated by the displacement estimate $\hat{D}_1{}^c$. These values are coupled to a second interpolator 841 via lines 840. This interpolator, which also receives the fractional displacement $\hat{D}_1{}^c - [\hat{D}_1{}^c]$ from subtraction circuit 835, provides two outputs; first, the intensity $I(\underline{x}_d - \hat{D}_1{}^c, t - \tau)$ is coupled to one input of subtractor 842, and second, the spatial gradient (rate of change of the intensity values at location $\underline{x}_d - \hat{D}_1{}^c$ is applied, on line 843, to the displacement update circuit 832. The second input to update circuit 832 is the displaced frame difference $DFD(\underline{x}_d, \hat{D}_1{}^c)$, computed by subtracting the displaced intensity value output from interpolator 841 from the undisplaced intensity value $I_d$ output from delay element 811, using subtraction circuit 842. The displacement update is formed in circuit 832 using equation (2) set forth above. The displaced frame difference output from subtractor 842 is also used for selection of the best predictor, and is thus applied to the third input of logic 815.

Further details of displacement compensated prediction, and its theory and results, will be obtained by consideration of the above-cited copending application.

The fourth prediction $p_4$ is obtained using <u>both</u> displacement and gain compensation, and for this reason two separate delay elements 850, 852 are provided to store present estimates of the gain factor $\rho_2$ and the displacement estimate $\underline{D}_2$. (The subscripts, as explained previously, have been added to distinguish these values from those computed in other parts of the circuit.) The outputs of each delay element are recursively combined in adder circuits 851, 853 with update terms generated in error computation circuits 854 and 855, respectively. As with simple displacement compensated prediction, updates occur only for moving area in the picture when switches 856 and 857, interposed between the error computation and adder circuits are closed, under control of the output from motion comparator 880.

The integral portion $[\hat{D}_2{}^c]$ of the displacement estimate $\hat{D}_2{}^c$, obtained using quantizer 858, is applied to a second read address input of memory 808, so as to recall therefrom stored intensity values for the displaced location $\underline{x}_z - [\hat{D}_2{}^c]$. These values are applied, via lines 861, to an interpolator 860, which also receives the fractional part of the displacement value from subtractor 859. The displacement compensated intensity value $I(\underline{x}_z - \hat{D}_2{}^c, t - \tau)$ output from interpolator 860 is multiplied, in accordance with the invention, by the gain factor $\hat{\rho}_2{}^c$ stored in delay element 850, using multiplier 862, and the multiplier output is the prediction $p_4$ applied to switch 812.

Unlike the previously described predictions, the update terms for both the displacement estimate and the gain adjustment factor are characterized in that each term is calculated as a function of the previous values of <u>both</u> $\rho$ and $\underline{D}$. Specifically, interpolator 863 receives stored intensity values from memory 808 via lines 864, which correspond to pels in the neighborhood of the location $\underline{x}_d - [\hat{D}_2{}^c]$, and also the fractional portion of $\hat{D}_2{}^c$. In response thereto, interpolator 863 computes the intensity value $I(\underline{x}_d - \hat{D}_2{}^c, t - \tau)$ and the intensity gradient $\nabla I(\underline{x}_d - \underline{\hat{D}}_2^c, t - \tau)$ at the displaced location. The intensity value thus calculated (on line 867) is coupled to error computation circuit 854 and to one input of multiplier 865, which computes the product $\hat{\rho}_2^c I(\underline{x}_d - \underline{\hat{D}}_2^c, t - \tau)$. To complete the inputs needed to implement equation (17), circuit 854 also receives the output of subtraction circuit 866, which represents the difference between $I_d$ and the gain/displacement compensated prediction thereof. Circuit 854 includes a multiplier circuit and an internal gain adjustment to account for the scaling factor $\epsilon$.

The intensity gradient value output from interpolator 863 is applied to displacement error computation circuit 855 on line 868, together with the output from subtraction circuit 866. These inputs enable circuit 855, which may comprise a multiplier circuit adapted to account for the scaling factor $\epsilon$, to compute the displacement correction term set forth in equation (18). The output of subtraction circuit 866, representing the prediction error associated with prediction $p_4$, is also coupled to logic 815 for selection purposes.

While four separate predictors are combined in the encoder of FIG. 8, it is to be understood that different subcombinations of these predictors can be employed, and that yet other types of prediction known in the prior art can also be added. In either event, logic 815 is arranged to select the best prediction as a function of the error associated with each prediction. Errors for a single pel, or for a group of pels can be considered, and simple averaging or mean-square analysis can be used.

An additional predictor can be obtained by adjusting the displacement compensated predictor $p_3$ in accordance with the gain factor $\rho_1$ developed for predictor $p_2$, rather than calculating separate gain and displacement factors $\rho_2$ and $D_2$. This arrangement has the advantage of simplicity, compared to the implementation of predictor $p_4$ just described. However, greater prediction errors are to be expected, since the $\rho_1$ and $D_1$ recursions are not interdependent, as in the apparatus of FIGS. 8 and 9.

The block diagram of a decoder for recovering the pictorial information encoded using the apparatus of FIG. 8 is shown in FIG. 11. The predictor portion 800 of the decoder is identical to the circuit used in FIG. 8, and need not be further explained.

The decoder of FIG. 11 includes a deformatter 1102 arranged substantially similar to deformatter 601 of FIG. 7. Its output, representing error values for unpredictable pels and "0" for predictable pels, is combined with the predicted intensity value $p_z$ output from predictor 800, in adder circuit 1103. The recovered intensity value $I'(x_z,t)$ is made available on line 1104 to a display or other utilization device, and also input to the memory within predictor 800.

Implementation of the encoders of FIGS. 3 and 8–9 can be simplified if a slight degradation in performance is tolerable. For example, the gain and displacement update circuits can be modified to account only for certain of the signs of the quantities involved, rather than the magnitudes. Specifically, equation (16) can be modified to:

$$\hat{\rho}_1^{i+1} = \hat{\rho}_1^i + \epsilon_i \text{sgn}[I(\underline{x},t) - \hat{\rho}_1^i(\underline{x},t-\tau)] \quad (21)$$

where $$\text{sgn}(u) = \begin{cases} 0, & \text{if } u = 0 \\ \dfrac{u}{|u|}, & \text{otherwise} \end{cases} \quad (22)$$

Similarly, equations (17) and (18) can be modified (respectively) to:

$$\hat{\rho}_2^{i+1} = \hat{\rho}_2^i + \epsilon_1 \cdot \text{sgn}[DFD(\underline{x}, \hat{\rho}_2^i, \underline{\hat{D}})] \quad (23)$$

and $$\underline{\hat{D}}^{i+1} = \underline{\hat{D}}^i - \epsilon_2 \cdot \text{sgn}[DFD(\underline{x}, \hat{\rho}_2^{i+1}, \underline{\hat{D}}^i)] \cdot \text{sgn} \nabla I(\underline{x} - \underline{\hat{D}}^i, t - \tau). \quad (24)$$

This simplified implementation was evaluated using computer simulations to encode three 60 frame picture sequences entitled "Judy", "Mike and Nadine" and "Mike and John". The first two sequences, "Judy" and "Mike and Nadine", are the same as those used in an article entitled "Motion Compensated Television Coding, Part I", *Bell System Technical Journal*, March 1979, pp. 629-668. The third sequence, "Mike and John", contains large areas of nonuniform illumination and movement of shadows, with people entering the camera field of view (25th frame) and briskly walking around each other. Although there are no moving objects in frames 0 to 24, the luminance of a considerable area changes as a result and shadows are generated by objects out of camera view. While the second and third sequences are similar to each other, "Mike and Nadine" is a panned view of two people who are always in the camera view. The percent of moving area (as determined by the "frame difference" segmentor) for the "Mike and John" sequence varies between 53 and 84. For these simulations, $\epsilon_1$ was set at 1/128 and $\epsilon_2$ was 1/16.

These results of the simulations are shown in the following table:

TABLE 1

| | AVERAGE BITS PER FIELD | | | |
|---|---|---|---|---|
| Scene | Previous Frame Prediction $P_1$ | Displacement Compensation $P_3$ | Gain Compensation $P_3$ | Gain and Displacement Compensation $P_4$ |
| Judy | 38,576 | 15,044 | 19,012 | 14,130 |
| Mike & Nadine | 94,975 | 71,407 | 84,401 | 64,401 |
| Mike & John | 66,136 | 56,548 | 40,164 | 36,612 |

As is seen from the foregoing, gain compensation was significantly better than previous frame (conditional replenishment) coding, for all picture sequences, but compared favorably to displacement compensation only for "Mike and John". When both gain and displacement compensation were used, as in the encoder of FIGS. 8–9, very significant improvement was obtained.

It will be apparent to those skilled in the art that various modifications and adaptations can be made to the above-described embodiments of the present invention without departing from the spirit and scope of the invention as a whole. Accordingly, it is intended that the invention be limited only by the following claims.

We claim:

1. Apparatus for encoding a video signal which represents the intensity values of a plurality of elements of a picture, including:

means for forming at least first and second predictions $p_1$ and $p_2$ of the intensity value $I(x,t)$ of a particular element in a present frame of said picture, means for comparing each prediction $p_1$ and $p_2$ with said intensity value $I(x,t)$ to determine which prediction produces the smaller error $e$, and means for encoding the magnitude of said error $e$ and the location of said particular element only if said magnitude exceeds a predetermined threshold T,

CHARACTERIZED IN THAT said prediction forming means includes means for forming one of said predictions $p_1$ by multiplying the intensity value $I(\underline{x},t-\tau)$ of said particular element in a previous frame of said picture by a recursively updated gain factor $\rho$.

2. The invention defined in claim 1 wherein said prediction forming means includes:

means for storing the present estimate of said gain factor $\hat{\rho}^i$, and means responsive to said storing means for updating said estimate to yield the succeeding estimate $\hat{\rho}^{i+1}$.

3. The invention defined in claim 2 wherein said updating means is arranged to form an update term as a function of the product of $I(\underline{x},t-\tau)$ and $I(\underline{x},t)-\hat{\rho}^i \cdot I(x,t-\tau)$.

4. The invention defined in claim 3 wherein said updating means includes means for multiplying said update term by a positive scaling factor $\epsilon$, where $10^{-5} \leq \epsilon \leq 10^{-2}$.

5. The invention defined in claim 1 wherein said second prediction $p_2$ is $I(\underline{x},t-\tau)$.

6. The invention defined in claim 1 wherein said second prediction is the intensity value $I(x-\hat{D},t-\tau)$ at a location in said previous frame displaced from the location of said particular element by a displacement estimate $\hat{D}$.

7. The invention defined in claim 6 wherein said prediction forming means includes:

means for storing the present displacement estimate $\hat{D}^i$, and means responsive to said storing means for updating said estimate to yield the succeeding estimate $\hat{D}^{i+1}$.

8. The invention defined in claim 7 wherein said updating means is arranged to form an update term as a function of the product of $I(\underline{x},t)-I(x-\hat{D},t-\tau)$ and $\nabla I(x-\hat{D},t-\tau)$, the spatial intensity gradient at said displaced location.

9. An encoder for a video signal including (1) means (808) for forming predictions of the intensity values of elements of a picture represented by said signal using the intensity values of corresponding picture elements in a previous frame of said picture, and (2) means (802, 811, 813, 820–825) for encoding an error signal derived by comparing each intensity value with a gain adjusted prediction obtained by multiplying said prediction of said each intensity value by a recursively updated gain factor $\hat{\rho}^{i+1}$.

10. The invention defined in claim 9 wherein said encoder further includes means (807) for reconstructing each intensity value by combining each of said gain adjusted predictions with the corresponding error value, and wherein said prediction forming means (808) includes a delay element arranged to delay said reconstructed intensity value by the time interval $\tau$ between said previous frame and the present frame.

11. The invention defined in claim 9 wherein said error signal encoding means is arranged to form said gain factor $\hat{\rho}^{i+1}$ by adding an update term to the gain factor $\hat{\rho}^i$ for the preceding pel, such that $$\hat{\rho}^{i+1} = \hat{\rho}^i + \epsilon[I(\underline{x},t) - \hat{\rho}^i I(\underline{x},t-\tau)]I(\underline{x},t-\tau)$$

where x is the vector location of a presently processed pel, $I(x,t)$ is the intensity of said present pel, $I(x,t-\tau)$ is the intensity of the same pel in said preceding frame, and $\epsilon$ is a positive scaling constant.

12. The invention defined in claim 9 wherein said prediction forming means further includes:

means for estimating the displacement of objects in said picture between said previous frame and a present frame, and means responsive to said estimating means for computing the intensity at the location in said previous frame displaced from the present pel by said estimate.

13. An encoder for a video signal including:

(a) means (350) for forming a plurality of predictions of the actual intensity value of a particular picture element (pel) in a present frame of the picture represented by said signal, (b) means (356, 359) for comparing each prediction with said actual value to form a plurality of prediction errors, and (c) means (390) for encoding the magnitude of the smallest of said prediction errors and the location of said pel, if said smallest magnitude exceeds a threshold value, CHARACTERIZED IN THAT said prediction forming means includes:

(1) means (308) for forming a first prediction using the intensity of said particular pel in a previous frame of said picture, and (2) means (351–357) for forming a second prediction by adjusting said first prediction in accordance with a recursively generated gain factor.

14. The invention defined in claim 13 wherein said second prediction forming means includes means for computing said gain factor as a function of said previous frame intensity value and the prediction error associated with said second prediction.

15. The invention defined in claim 14 wherein said first prediction forming means comprises a delay element having a delay interval $\tau$ which is the time between successive frames of said picture.

16. The invention defined in claim 15 wherein said computing means includes:

(a) means for storing successive estimates of said gain factor, (b) means for forming the product of said prediction error and said previous frame intensity value, and (c) means for combining said product with the one of said estimates stored in said storing means.

17. A method of encoding a video signal which represents the intensity values of a plurality of elements of a picture, comprising the steps of:

forming at least first and second predictions $p_1$ and $p_2$ of the intensity value $I(x,t)$ of a particular element in a present frame of said picture, comparing each prediction $p_1$ and $p_2$ with said intensity value $I(x,t)$ to determine which prediction produces the smaller error $e$, and encoding the magnitude of said error e and the location of said particular element only if said magnitude exceeds a predetermined threshold T,

CHARACTERIZED IN THAT said prediction forming step includes forming one of said predictions $p_1$ by multiplying the intensity value $I(\underline{x},t-\tau)$ of said particular element in a previous frame of said picture by a recursively updated gain factor $\hat{\rho}$.

18. The method defined in claim 17 wherein said prediction forming step includes:

storing the present estimate of said gain factor $\hat{\rho}^i$, and updating said stored present estimate to yield the succeeding estimate $\hat{\rho}^{i+1}$.

19. The method defined in claim 18 wherein said updating step includes forming an update term as a function of the product of $I(\underline{x},t-\tau)$ and $I(\underline{x},t)-\hat{\rho}^i \cdot I(\underline{x},t-\tau)$.

20. The method defined in claim 19 wherein said updating step includes multiplying said update term by a positive scaling factor $\epsilon$, where $10^{-5} \leq \epsilon \leq 10^{-2}$.

21. A method of encoding a video signal including (1) forming predictions of the intensity values of elements of a picture represented by said signal using the intensity values of corresponding picture elements in a previous frame of said picture, and (2) encoding an error signal derived by comparing each intensity value with a gain adjusted prediction obtained by multiplying said prediction of said each intensity value by a recursively updated gain factor $\hat{\rho}^{i+1}$.

22. The method defined in claim 21 wherein said encoder step includes the step of reconstructing each intensity value by combining each of said gain adjusted predictions with the corresponding error value, and wherein said prediction forming step includes the step of delaying said reconstructed intensity value by the time interval $\tau$ between said previous frame and the present frame.

23. The method defined in claim 21 wherein said error signal encoding step includes forming said gain factor $\hat{\rho}^{i+1}$ by adding an update term to the gain factor $\hat{\rho}^i$ for the preceding pel, such that $$\hat{\rho}^{i+1} = \hat{\rho}^i + \epsilon[I(\underline{x},t) - \hat{\rho}^i I(x,t-\tau)]I(\underline{x},t-\tau)$$

where x is the vector location of a presently processed pel, $I(x,t)$ is the intensity of said present pel, $I(x,t-\tau)$ is the intensity of the same pel in said preceding frame, and $\epsilon$ is a positive scaling constant.

24. The method defined in claim 21 wherein said prediction forming step further includes:

estimating the displacement of objects in said picture between said previous frame and a present frame, and computing the intensity at the location in said previous frame displaced from the present pel by said estimate.

* * * * *